United States Patent [19]
Davis

[11] Patent Number: 5,174,031
[45] Date of Patent: Dec. 29, 1992

[54] PROPORTIONAL CROPPING TEMPLATE

[76] Inventor: Dale Davis, 717 Oregon Ave., Erie, Pa. 16505

[21] Appl. No.: 342,023

[22] Filed: Apr. 24, 1989

[51] Int. Cl.$^5$ .......................... G01B 3/00; B43L 5/00
[52] U.S. Cl. .................................. 33/113; 33/DIG. 9
[58] Field of Search ................. 355/125, 126, 74, 133; 33/1 B, 623, DIG. 9, 562

[56] References Cited

U.S. PATENT DOCUMENTS

| | | | |
|---|---|---|---|
| 1,403,677 | 1/1922 | Faas | 355/125 |
| 4,171,573 | 10/1979 | Picciotto | 33/1 B |
| 4,704,796 | 11/1987 | Gauer | 355/74 X |

Primary Examiner—Harry N. Haroian

[57] ABSTRACT

An assortment of proportional cropping templates for film, contacts or prints designed with various cutouts and having demarcations to give depth measurements when selected image is enlarged to a specific width size. An assortment of templates of preferred embodiment such as metal, tinted acetate or plastic, each designed to overlay on film, contacts or prints. Each template will have various sized vertical cutouts to allow tracing and viewing of any desired crop selection. Each cutout has along either side, inch demarcations that represent the actual depth size of an image when that cutout portion is enlarged to the specific width size labled on the template.

4 Claims, 2 Drawing Sheets

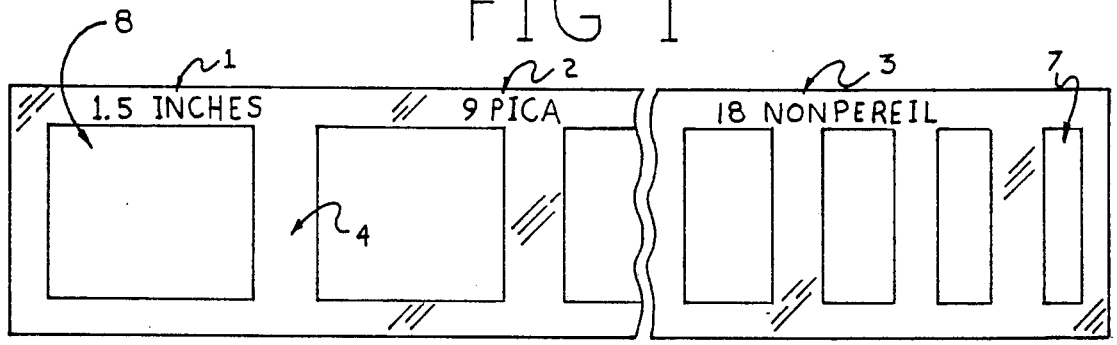
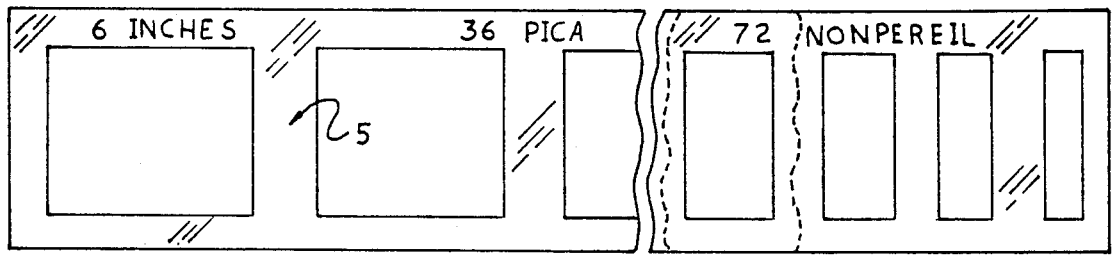
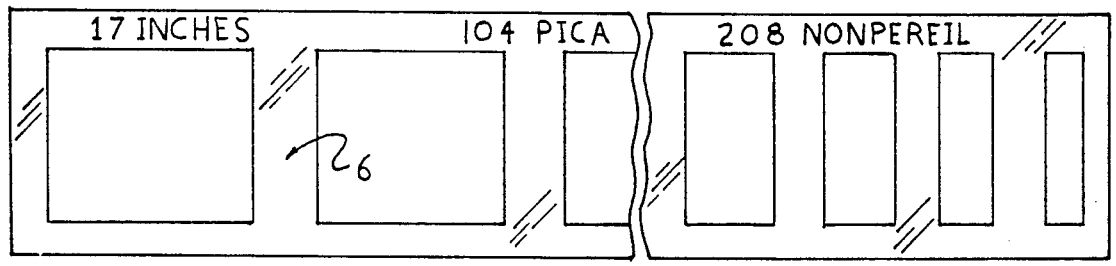
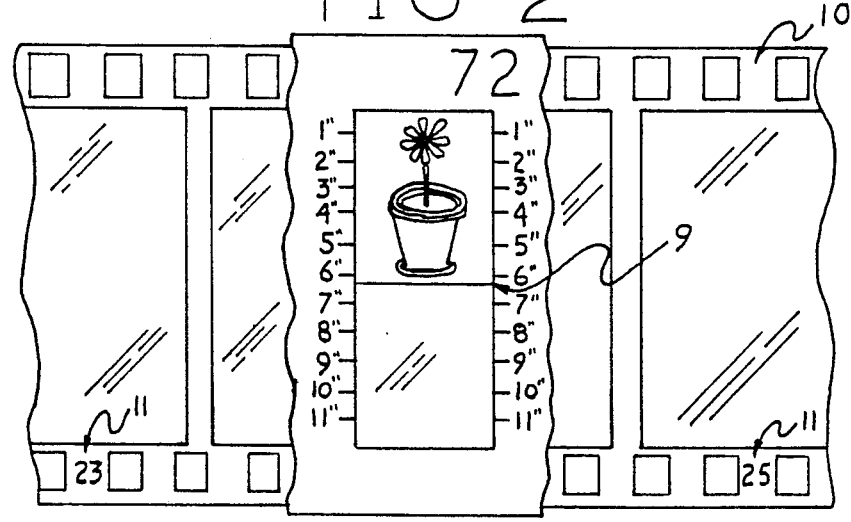

PROPORTIONAL CROPPING TEMPLATE

BACKGROUND

1. Field of the Invention

An assortment of templates with various size cutouts for tracing particular selected crop images. Each cutout having inch demarcations for determining what the depth of a finished print will be after being enlarged to the specific width marked on that particular template.

BACKGROUND AND SUMMARY OF THE INVENTION

This invention relates to a system for selecting and cropping certain desirable portions of a visual work and provides a means of seeing what the depth dimensions will be after those portions have been enlarged to the desired width size.

When working within the media business, particularly the newspaper and magazine publication business, it is common to include photographs within the publication and these photographs are generally selected from contact sheets or film transparencies. It is often desirable to select only portions of an original visual art for publications and this selection is referred to as a cropping.

The cropped portion is then enlarged to a desired width to fit into the publication columns. The depth dimension is also increased proportionally and must be known in order to arrange type and copy.

The object of the present invention is to provide a novel and simple overlay template which provides a selection of different width cropping apertures with measuring demarcations along the sides of each aperture for easy and accurate depth information of the image after it has been enlarged.

DRAWINGS

These and other objects and advantages will become more fully apparent as the following description is read in conjunction with the drawings within:

FIG. 1 is a view of 3 different overlaying cropping templates showing various sized apertures with each template having different labels representing the different enlargement width sizes.

FIG. 2 is a blowup view of visual art, 35 mm film in this case, with a frame of a potted flower being cropped by an overlaying section of a cropping template showing depth demarcations.

DESCRIPTION OF PREFERRED EMBODIMENTS OF THE INVENTION

Figure 3:
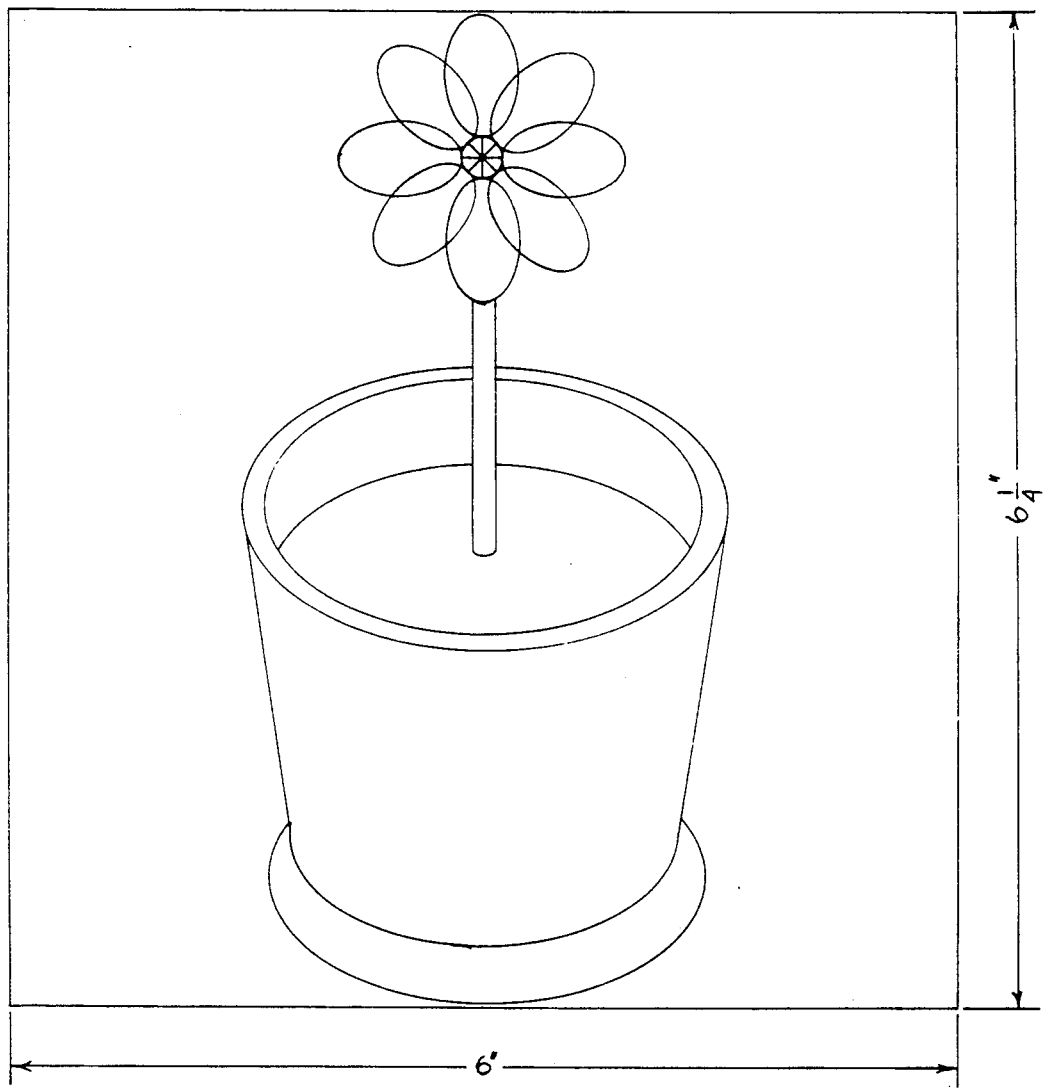
FIG. 3 is a view of the selected cropped image fully enlarged to 6", 36 pica or 72 nonpereils wide as noted by the template label and 6¼" deep as seen by the measuring demarcations on the template in FIG. 2.

Preferred embodiments of the invention will be descrided herein as examples of selecting portions of film, contact sheets or other visual work and how measuring demarcations along the sides of the apertures represent the enlarged depth dimensions.

Referring first to FIG. 1 which illustrates 3 individual 35 mm film cropping templates, each being labeled in inches, picas and nonpereils (items 1, 2 & 3). Different publication companies refer to column width sizes using different terminology with one inch being equal to 6 picas or 12 nonpereils. These label sizes represent the finished width size of a desired crop selection after enlargement. Item 4 is a template representing columns 1½ inches, 9 picas or 18 nonpereils in width, Item 5 is a template representing columns 6 inches, 36 picas or 72 nonpereils in width. Item 6 is a template representing columns 17.33 inches, 104 picas or 208 nonpereils in width.

Each template has an assortment of different width apertures with the widest, item 8, being equal to the full width of a 35 mm frame of film and each getting narrower by 1/12 with the smallest, item 7, being 1/12 of the full frame size giving a full selection of cropping apertures to select from.

FIG. 2 shows a blow up view of a piece of 35 mm film, item 10, showing film numbers, items 11. The middle frame containing a potted flower is shown being cropped by the template from FIG. 1 marked 72 nonpereils with section lines. The numbers along the vertical sides of each aperture represent the depth of the picture in inches after it has been enlarged and show that if this crop were enlarged to 6 inches, 36 picas or 72 nonpereils wide as noted on the label the depth of the finished enlargement would be 6¼ inches as seen in item 9.

FIG. 3 shows the actual proportional enlargement of the cropped flower with sizes corresponding to the template label and demarcations of 6 inches wide and 6¼ inches deep.

BACKGROUND—DISCUSSION OF PRIOR ART

In the media business, particulary the newspaper publication business, it is common to include photographs in the newsprint. These photographs are generally selected from contact sheets which are 8"×10" pieces of photographic paper with images from complete rolls of film on them. The processed negatives are laid in contact with the photographic paper. A light is passed thru the negative thus exposing the images onto the paper. When the paper is developed the images come up in positive form. Each individual 35 mm frame is approx. 1½" wide×1" deep (long) and here after referred to as a contact. This contact sheet, containing up to 36 contacts, is used by editors, photographers or reporters to select which contact best protrays the subject matter. After the contact is selected it is most often desirable to select only a portion of the contact for enlargement and use in publication. The selection of just part of a contact and elimination of other parts is referred to as cropping. Once a cropped image is decided on it is traced or outlined with a pen or grease pencil freehand. The size of the enlarged print must be determined and relayed to the darkroom for printing and to the composing department for arranging copy (printed material).Photographs are enlarged to equal column sizes or ½ column sizes, with the most common column sizes being 1, 1½, 2, 2½, 3, 3½, and 4. Each publication has a set width dimension for each column size and these dimensions are in picas and nonpereils. A pica is equal to 1/6 of an inch with 6 picas being equal to 1 inch and 2 nonpereils being equal to 1 pica. Most publication column sizes vary in width and range between 8 to 15 picas wide.

The width of a picture is determined by the number of columns it is to cover. The cropped image is enlarged until its width fills the selected column size. The depth dimension is enlarged proportionally and, with prior art, requires a proportional wheel, or the darkroom enlarger to determine the depth dimensions.

In using the proportional wheel measure the width of the cropped contact in picas. Find this number on the small wheel and spin the wheel to line this number up with the column width size selected,in picas,on the big wheel. The wheel is no set to give proportional readings. The depth of the cropped contact is measured in picas and located on the small wheel. This number is matched to the corresponding numbers on the large wheel which will be the depth measurment in picas. Divide this number by 6 to get depth in inches.

There is also a formula for finding the depth of a picture, from a contact, by using a slide rule but it also requires fine measuring and plugging in figures. Although these methods can be done accurately they involve taking measurments, moving parts and matching up numbers. The proportional wheel and slide rule are not fully understood or used by many of the people in the need to crop pictures. With the confusion and deadline pressures typical with the media business mistakes are waiting to happen.

There are many other devices for cropping images from prints or film, as previously cited in related U.S. Patent Documents, however they are all cumbersome and designed to concentrate only on cropping the image and do not have the ability to give proportional measurments of a print after image has been enlarged to a different proportional dimension. A cropped portion of an image may be selected by prior art and determined that this crop will fill a photograph measuring 4"×5", 8"×10" or 16"×20" but they lack the ability to determine how deep the picture will be if the selected crop image is enlarged to 5¾ wide. Also prior art is confined to proportional dimensions which render rectangular images. These devices would be inappropriate if a horizontal sunset image was desired to be cropped longer and narrower than the proportional limitations permit in prior art.

OBJECTS AND ADVANTAGES

The primary object of the present invention is to provide a device of extremely simple structure, allowing user to slide or overlay a particular template across a contact, negative or a print. Upon finding a cutout size, that crops or masks an image to include the most pleasing composition, it is then traced. By reading the inch marks along the sides of the template cutout the user is able to determine the depth size of a completed cropped print. The time savings would be considerable by elimination the need to use the wheel, slide rule or to do any type of measuring. The user would have the ability to rapidly slide the template across many different crop selections and be able to determine sizes by glancing at the template.

Another object of this invention would be to improve the freehand method of crop outlining. Having straight lines and square corners would have an effect on improving initial visualization of a cropped image. The process of relaying this information to the darkroom technician would also be improved, enhancing the quality of completed images befor going to the presses.

Further objects and advantages of the invention will become apparent from a consideration of the ensuing description and the accompanying drawing.

METHOD OF OBTAINING INCH DEMARCATIONS

Materials needed:
enlarger
negative, with many distinguishable features
set of 12 master cards each being 8" deep×12" long, overall measurement Each master card consists of 3 pieces of poster board, 2 sides in white and 1 middle being black. The white sides are the background for marking inches, and the black middle represents the various size cutouts. The 8"×10" size represents the negative size approx. 1"×1⅛" when enlarged 8½times which provides a good workingsize for transferring marks and numbers. Each black middle represents a different size cutout so they must be of various progressive sizes while maintaining overall 12" dimensions. Starting with 1" black middle and 5½" white on each side totals 12". Next a 2" black middle with 5" white sides etc. till all cards are complete and ready for inch marks.
master photo of selected negative, enlarged till depth fits 8" at which point length will be approx. 12". This will be used to transfer inch marks. Finished master photo is then divided into 1" columns, each being identical to one of the masters.
Compass used for transferring measurments.

Example:(36 pica template, 5" middle representing 5/12the full frame cutout) Find 5" wide marks on master photo and locate 2 distinguisable features. Raise enlarger head untill these 2 features are exactly 36 picas(6") apart. Then with a ruler find 2 features that are exactly 1"apart in the image produced by the enlarger and locate same 2 images on the master photo and set ccmpass. The compass can now be used to transfer the 1" measurment to the 5" master. With the 1" mark located on the 5"master card the others can be located. Repeat this procedure for remaining 11 master cards and a complete set will be ready for reduction to 35 mm size photographically, using a 35 mm camera. After trimming processed film and cutting out the cutouts with an exacto knife a 6", 36 pica and 72 nonpereils cropping template is complete.

There is a formula to use with a calculator to find inch demarcations but I have not tested its reliability yet.

I claim:

1. A set of cropping templates for cropping and determining the depth dimension of a visual work when a selected portion is enlarged to a specific width dimension, each of said templates comprising of an overlay having a plurality of cutouts or apertures differing in width, the largest of said apertures encompassing the entire visual work and the remaining apertures being progressively smaller in width so as to provide a width crop selection of any portion of said visual work, each of said apertures having measuring demarcations along a vertical side representing the resulting depth dimensions of the cropped portion after it has been enlarged to the width specified on the template, and each of said templates representing a different enlargement width size desired.

2. The cropping template of claim 1 wherein the measuring demarcations are removable and interchangeable with measuring demarcations representing different enlargement width sizes.

3. The cropping template of claim 1 wherein said template is a sheet and said apertures comprise transparent void free portions of said sheet with measuring demarcations along vertical sides.

4. A method of determining what the depth dimension of a visual work or cropped portion thereof will be when that portion is enlarged to a specific width dimension comprising the steps of:

a) selecting one of a set of cropping templates with the specific size label corresponding to the desired enlarged width size, with each of said templates having a plurality of various width visual apertures with measuring demarcations positioned along at least one vertical side of each aperture, b) positioning the overlay over the work with the margins of the aperture most closely defining the boundaries of the selected portion of the work, c) noting the measuring demarcation corresponding to the bottom of the selected portion of visual work indicating the depth of that visual work when it has been enlarged to the desired width specified on the selected template.

* * * * *